(12) United States Patent
Hall, Jr.

(10) Patent No.: US 6,356,390 B1
(45) Date of Patent: Mar. 12, 2002

(54) LIGHT VALVE LIGHT SOURCE

(75) Inventor: Estill Thone Hall, Jr., Fishers, IN (US)

(73) Assignee: Thomson Licensing, S.A., Boulogne Cedex (FR)

( * ) Notice: Subject to any disclaimer, the term of this patent is extended or adjusted under 35 U.S.C. 154(b) by 0 days.

(21) Appl. No.: 09/599,626

(22) Filed: Jun. 22, 2000

(51) Int. Cl.[7] ............................................. G02B 27/10
(52) U.S. Cl. ...................................... 359/627; 359/626
(58) Field of Search ................................ 359/618, 626, 359/627; 362/268, 241, 296, 347, 350, 800, 247

(56) References Cited

U.S. PATENT DOCUMENTS

| | | | | |
|---|---|---|---|---|
| 5,534,718 A | * | 7/1996 | Chang | 257/98 |
| 5,594,756 A | | 1/1997 | Endriz | 347/241 |
| 5,690,417 A | * | 11/1997 | Polidor | 362/244 |
| 5,704,700 A | * | 1/1998 | Kappel | 353/31 |
| 5,802,092 A | | 9/1998 | Endriz | 372/50 |
| 6,179,439 B1 | * | 1/2001 | Choate | 362/247 |
| 6,204,955 B1 | * | 3/2001 | Chao | 359/298 |

FOREIGN PATENT DOCUMENTS

JP        11176220 A    * 11/1999    ............. F21V/5/00

* cited by examiner

*Primary Examiner*—Georgia Epps
*Assistant Examiner*—Gary O'Neill
(74) *Attorney, Agent, or Firm*—Joseph S. Tripoli; Joseph J. Laks; Daniel E. Sragow

(57) ABSTRACT

A projection light valve system comprises a ring of light sources directed toward a parabolic reflector. The reflector reflects the light to a point of focus. An optical means, such as a lens, directs the light to a beam expander which expands the beam to irradiate a light valve. Multiple arrangements can be used to obtain a multicolor image.

12 Claims, 1 Drawing Sheet

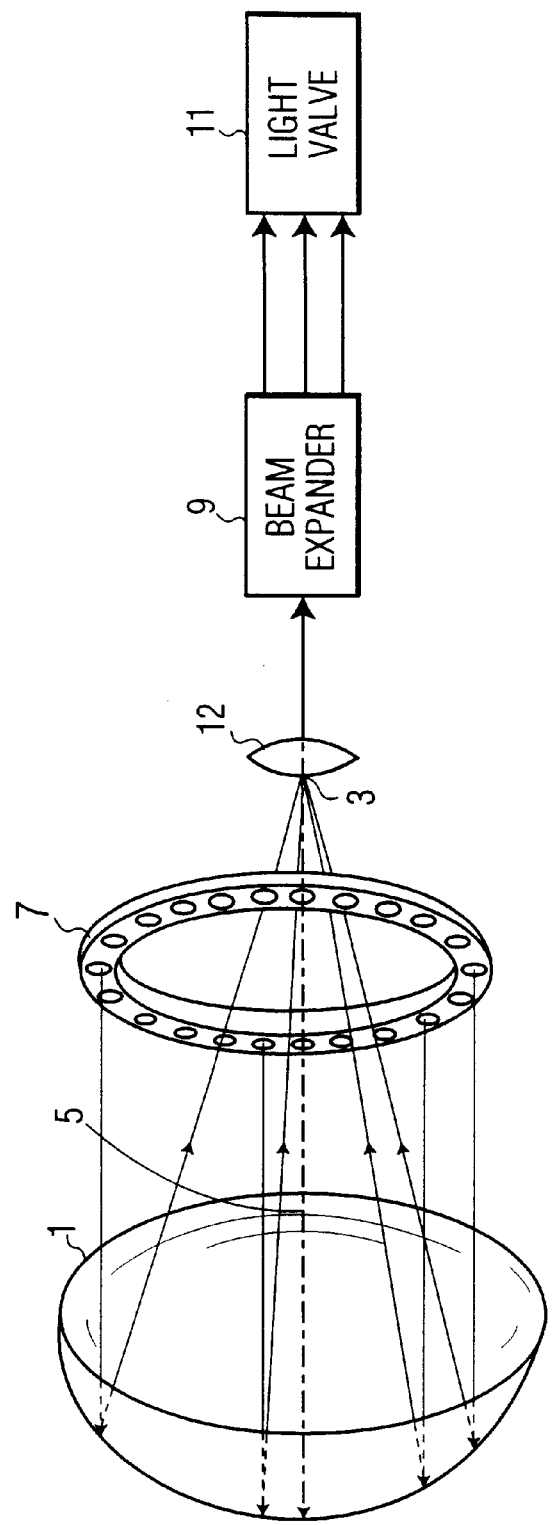
FIGURE

LIGHT VALVE LIGHT SOURCE

TECHNICAL FIELD

The present invention relates to a source of illumination for a light valve using a plurality of light sources.

BACKGROUND

Light valves are used in projection video apparatus. A beam of light is expanded to uniformly irradiate the input of a light valve, which modulates the light to produce an image. Three light valve arrangements can be used to modulate light of three different colors, such as red, green and blue, to produce a full color image.

An efficient source of illumination is a laser diode. Laser diodes are now available to produce red, green and blue illumination. However, the light level produced by a laser diode is not sufficient to produce an image of satisfactory brightness when a light valve arrangement is used, for example, in a theater. The instant invention advantageously provides a source of illumination for a light valve which has greatly increased brightness.

SUMMARY OF THE INVENTION

A source of illumination comprises a parabolic reflector having an axis and a point of focus on said axis. A plurality of light sources are directed substantially parallel to the axis of the parabola so that the light from the plurality of light sources is reflected to the point of focus of the parabolic reflector.

A projection light valve system, in which a source of light illuminates a light valve which modulates the illuminating light to produce an image, comprises a parabolic reflector having an axis and a point of focus. A plurality of sources of substantially monochromatic light are each directed toward the parabolic reflector in a path substantially parallel to the axis of the reflector so that the light reflected from the reflector is directed toward the point of focus of the reflector. Optical means are positioned at the point of focus for forming a beam of light from the light reflected from the reflector. Means are located between the optical means and a light valve device for expanding the beam of light to substantially uniformly illuminate the light valve device.

DESCRIPTION OF THE DRAWING

The sole FIGURE is a partially schematic illustration of a light source and light valve apparatus using such source.

DETAILED DESCRIPTION OF THE PREFERRED EMBODIMENTS

Referring to the FIGURE, a plurality of light sources, preferably laser diodes, are arranged in the shape of a ring 7. Each of these sources is positioned to direct its light toward parabolic reflector 1 having an axis 5. Each of the sources directs its light toward the parabolic reflector 1 in a path which is parallel to axis 5 so that the light reflected from parabolic reflector 1 passes through the ring 7 of light sources to point 3 which is the point of focus of the parabolic reflector 1. Ring 7 is positioned in a plane perpendicular to axis 5, and has its center on axis 5.

Lens 12 is positioned at the point of focus of parabolic reflector 1. Lens 12 focuses the light from parabolic reflector 1 to a beam which is fed to beam expander 9. Beam expander 9 expands the beam so as to uniformly illuminate light valve 11.

Multiple light valve arrangements can be used to provide a multicolor display. In such an arrangement, three of the arrangements shown in the FIGURE are provided, each having a ring of sources which generates a different color, such as red, green and blue. Each light valve produces an image of a particular color. The three images are combined in a well-known manner to provide a multicolor display.

One embodiment of a multicolor display is a rear projection television display where three monochrome images of different colors are superimposed on the rear surface of a projection screen, which is viewed from the front surface of the screen.

What is claimed is:

1. A source of illumination, comprising:

a parabolic reflector having an axis and a point of focus on said axis, and a plurality of light sources directed substantially parallel to said axis of said parabolic reflector, said point of focus being located on the side of said light sources away from said reflector, so that the light from said plurality of light sources is reflected to the point of focus of said parabolic reflector.

2. A source of illumination as defined by claim 1, in which said plurality of light sources are arranged in a circle.

3. A source of illumination as defined by claim 2, in which the plane of said circle is substantially perpendicular to said axis of said parabolic reflector.

4. A source of illumination as defined by claim 3, in which the center of said circle lies on said axis of said parabolic reflector.

5. A source of illumination as defined by claim 1, in which each of said plurality of light sources is a laser diode.

6. A source of illumination as defined by claim 5, in which each of said laser diodes emits light of the same color.

7. A projection light valve system in which a source of light illuminates a light valve which modulates the illuminated light to produce an image, said system comprising:

a) a parabolic reflector having an axis and a point of focus;

b) a plurality of sources of substantially monochromatic light, said sources each being directed toward said parabolic reflector in a path substantially parallel to the axis of said reflector, the light reflected from said reflector directed toward said point of focus, said point of focus being located on the side of said light sources away from said reflector;

c) optical means positioned at said point of focus for forming a beam of light from the light reflected from said reflector;

d) a light valve device; and e) means located between said optical means and said light valve device for expanding said beam of light to substantially uniformly illuminate said light valve device.

8. A projection light valve system as defined by claim 7, in which said plurality of sources are arranged in a circle whose diameter is substantially perpendicular to the axis of said parabolic reflector.

9. A projection light valve system as defined by claim 7, in which said sources of substantially monochromatic light are laser diodes.

10. A projection light valve system as defined by claim 8, in which the light reflected from said reflector passes through said circle.

11. A projection light valve system as defined by claim 8, in which the center of said circle lies on said axis of said reflector.

12. A projection light valve system as defined by claim 8, in which said point of focus lies on said axis of said reflector at a point further from said reflector than said circle.

* * * * *